United States Patent
Wang et al.

(10) Patent No.: US 8,995,585 B2
(45) Date of Patent: Mar. 31, 2015

(54) CARRIER RECOVERY METHOD AND CARRIER RECOVERY DEVICE FOR PSEUDO RANDOM NOISE BASED SYSTEM

(75) Inventors: Yuanli Wang, Shanghai (CN); Bowei Song, Shanghai (CN); Yu Pan, Shanghai (CN)

(73) Assignee: Entropic Communications, Inc., San Diego, CA (US)

( * ) Notice: Subject to any disclaimer, the term of this patent is extended or adjusted under 35 U.S.C. 154(b) by 1353 days.

(21) Appl. No.: 12/670,397

(22) PCT Filed: Jul. 23, 2007
(Under 37 CFR 1.47)

(86) PCT No.: PCT/EP2007/006516
§ 371 (c)(1),
(2), (4) Date: Jun. 20, 2011

(87) PCT Pub. No.: WO2009/012790
PCT Pub. Date: Jan. 29, 2009

(65) Prior Publication Data
US 2012/0163507 A1     Jun. 28, 2012

(51) Int. Cl.
*H04L 27/06* (2006.01)
*H04L 27/00* (2006.01)
*H04L 27/26* (2006.01)
*H04W 28/04* (2009.01)

(52) U.S. Cl.
CPC ........ *H04L 27/0014* (2013.01); *H04L 27/2659* (2013.01); *H04L 27/266* (2013.01); *H04L 27/2675* (2013.01); *H04L 27/2695* (2013.01); *H04W 28/04* (2013.01)
USPC .......................................... 375/343

(58) Field of Classification Search
CPC .............. H04L 27/2659; H04L 27/266; H04L 27/2695
USPC ......................................... 375/316, 340, 343
See application file for complete search history.

(56) References Cited

U.S. PATENT DOCUMENTS 5,991,344 A * 11/1999 Fujii et al. ..................... 375/344
6,298,227 B1 * 10/2001 Molnar ......................... 455/323

FOREIGN PATENT DOCUMENTS

WO     WO 02/32067 A1     4/2002

* cited by examiner

*Primary Examiner* — Kevin M Burd
(74) *Attorney, Agent, or Firm* — Richard Bachand

(57) ABSTRACT

The invention regards to Carrier recovery device, especially estimator device for carrier recovery, for pseudo random noise based systems, comprising a coarse estimator (13), a fine estimator (14), a switch (15) to select estimator output, and a sweeper (20) to sweep input data carrier frequency offset within a certain range, wherein the coarse estimator (13) is arranged to estimate a residual frequency offset by using a correlation of pseudo random noise (PN), and the fine estimator (14) is arranged to estimate the residual frequency offset by using an estimated channel information, and wherein the switch (15) is controlled to select data outputted out of the coarse estimator (13), the fine estimator (14) or the sweeper (20) as the estimator output.

16 Claims, 3 Drawing Sheets

CARRIER RECOVERY METHOD AND CARRIER RECOVERY DEVICE FOR PSEUDO RANDOM NOISE BASED SYSTEM

TECHNICAL FIELD

Various embodiments of the present disclosure pertain to a carrier recovery device for pseudo random noise based systems and to a carrier recovery method for pseudo random noise based systems.

BACKGROUND ART

To achieve a good performance of digital communication systems the carrier recovery is very important. In wireless communication systems, the sensitivity to frequency offset is one of the major issues for practical application. If the carrier frequency offset will be not properly compensated, it would result in a shift of the sub-carrier indices and thus produce inter-carrier interference in multi-carrier system. In single carrier system, the frequency offset will cause instability of the time-domain equalizer.

The carrier frequency offset is mainly caused by transmitter-receiver oscillator instabilities and Doppler shift in mobile environment.

There are a lot of existing methods to estimate the carrier frequency offset. A method uses a correlation to estimate the carrier frequency offset, but its estimation range is not large enough in some situations. Another method uses a FFT (Fast Fourier Transformation) to estimate the carrier frequency offset, but the accurate position of the training sequence need to be known before estimation.

A PN-based structure (PN: Pseudo random Noise) is adopted in terrestrial digital TV broadcasting standard in China. There are three kinds of frame structure in this system as shown in FIG. 7. There are shown three frame structures, which are used in the terrestrial digital TV broadcasting standard (TV: Television Standard) in China.

The frame structures starts with a frame head of different length being followed by data having length of 3780 data symbols.

The first frame structure (a) uses an 8th-order m sequence to generate PN. The first 82 symbols and the last 83 symbols in frame head of the first frame structure (a) are pre-cyclic and post-cyclic of the PN sequence. In 225 consecutive frames, the PN has different phase in different frames.

The second frame structure (b) uses a 10th-order m sequence to generate PN and uses the first 595 bits of this PN sequence as the frame head.

The third frame structure (c) uses a 9th-order m sequence to generate PN, the first 217 symbols and the last symbols in frame head being pre-cyclic and post-cyclic of the PN sequence. In 200 consecutive frames, the PN has different phase in different frames.

Considering the complexity of the system, the method should estimate the carrier frequency offset no matter what the structure of the frame head is.

FIG. 8 shows a block diagram of carrier recovery in a digital system. RF signals s (RF: Radio Frequency) are send from a transmitter 1 via antennas and an airborne link V to a receiver comprising a tuner 2. The tuner 2 receives the RF signal s from the antenna and converts it to the expected IF signal IF. An in-phase and quadrature demodulation (iqm) 3 comprises a frequency spectrum shifter and some filters. The iqm module 3 moves the IF signal IF to baseband. After the iqm module 3, a carrier recovery module (cr) 4 is followed, which is in the head of other demodulation block in the baseband. The following block's performance would be affected when a residual frequency offset is large. In PN-based systems, the correlation value of PN sequence would be used for frame synchronization and timing recovery module (tr) 5, but existence of the large residual carrier frequency offset would cause very bad correlation performance. Even no peak appears at all. And inter-carrier interference (ICI) would be imported when a fractional frequency offset of sub-carrier exists. Further, such arrangement comprises a channel estimation and equalizer module (che/eq) 6 output of which is coupled to the carrier recovery module 4 and to a forward error correction module (fec) 7.

According to such state of the art devices and methods critical points for carrier recovery are widen of given estimation ranges and an increase of the estimate precision.

FIG. 9 shows a block diagram of devices executing a known method of carrier recovery. Input data id or an input signal are fed to a rotator 11. The block of the rotator 11 is used to compensate a carrier frequency offset for the input signal. Signal output out of the rotator 11 are inputted into a selector 12. The selector 12 is constructed and/or controlled to find a coarse position of PN sequence to be used in following estimator modules 13, 14 for estimation of frequency offset. A coarse estimator 13 of these estimator modules 13, 14 adapts a squared correlation result of its input signal to estimate the carrier frequency. After such coarse estimation, a residual carrier frequency offset is within a small range. The fine estimator 14 of these estimator modules 13, 14 correlates its input data with local PN sequence to estimate the residual frequency offset. This method uses the correlation results to estimate the frequency offset in each step. A state control 16 controls a switch 15. The switch is arranged to forward signal either outputted from coarse estimator 13 or outputted from fine estimator 14 to input of a low pass filter (LPF) 17. Data or signal filtered by the low pass filter 17 are inputted into a numerical controlled oscillator (NCO) 18. Signal or data outputted out of this NCO 18 are inputted into the rotator 11.

A main drawback of this method is that result is not stable when estimating a large frequency offset. Further, the residual frequency offset is not small enough when the PN sequence has different phase in different frames within a certain convergent time.

It is an object of the invention to provide an other carrier recovery device for pseudo random noise based systems and to provide a carrier recovery method for pseudo random noise based systems, especially, being able to estimate large frequency offsets.

Especially, it is an object is to find a way using PN (Pseudo random Noise) to estimate the carrier frequency offset in a wide range, no matter whether it is multi-carrier systems or single-carrier systems. Preferably, method and device solving such object should be able to work without exact information of the position of the training sequence.

Advantageous Effects

Especially, there is provided a carrier recovery device, especially estimator device for carrier recovery, for pseudo random noise based systems, comprising a coarse estimator, a fine estimator, and a switch to select estimator output. According to preferred embodiment this device comprises a sweeper to sweep input data carrier frequency offset within a certain range, wherein the coarse estimator is arranged to estimate a residual frequency offset by using a correlation of pseudo random noise, and the fine estimator is arranged to estimate the residual frequency offset by using an estimated channel information, and wherein the switch is controlled to select data outputted out of the coarse estimator, the fine estimator or the sweeper as the estimator output. Especially, each of the coarse estimator, the fine estimator or the sweeper can be used separately or can be combined according to the need of system's performance.

Especially, in the sweeper, each of a number of parallel scanners or one scanner is arranged to use pre-defined frequency value each to rotate data inputted into the scanner and to calculate a detected value, and a comparator is arranged to select the one of such scanner output values which is the closest one to the real frequency offset. Especially, at least one scanner in the sweeper can comprise a pre-rotator being arranged to rotate data inputted into the pre-rotator by using a pre-defined frequency value. A detector can be arranged for each scanner to calculate a rotated data's slide accumulated value's amplitude on basis of data outputted out of the scanner.

Especially, the coarse frequency estimator is arranged to estimate a coarse frequency offset by squaring signal from a rotator and/or a selector when the pseudo random noise sequence has different phase in different frames. The coarse frequency estimator can be arranged to filter squared signal to decrease the effect of noise.

Especially, the fine estimator is arranged to estimate a fine frequency offset by using an estimated channel information to estimate the residual frequency offset. The fine frequency estimator can comprise a storage to store a pre-frame's estimated channel information, a first selector to select an estimated channel's path whose amplitude is larger than a threshold, a second selector to select the pre-frame's estimated channel's path with same selected position in present one, a correlator to correlate the selected channel information outputted out of selectors with each other, a filter to calculate a common phase difference in two consecutive estimated channel information, and a phase detector to extract a phase difference and to get the residual frequency offset.

Further, there is provided a carrier recovery method for pseudo random noise based systems, especially method to be executed in such a device, wherein during estimation frequency offset data are calculated or estimated in a first step in a sweeper input data carrier frequency offset is calculated within a certain range, in a second step in a the coarse estimator there is estimated a residual frequency offset by using a correlation of pseudo random noise, and in a third step in a fine estimator there is estimated the residual frequency offset by using an estimated channel information, wherein switching between the steps is done depending on the residual frequency offset's amount outputted out of the coarse estimator, the fine estimator or the sweeper as the estimator output.

DESCRIPTION OF DRAWINGS

An embodiment will be disclosed in more details with respect to enclosed drawing. Components and modules signed with same reference signs like in FIGS. 1 and 9 can be arranged or executed like corresponding components of prior art arrangements. Components and modules shown in the figures can be implemented by hardware, by software and/or by combined hard- and software. There are shown in.

DETAILED DESCRIPTION

Figure 1:
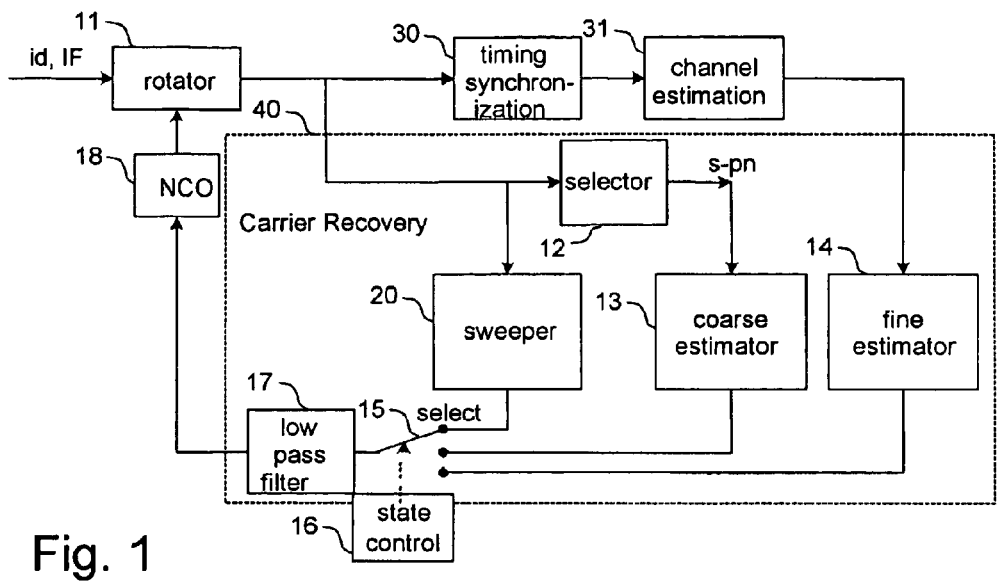
FIG. 1 a block diagram of devices or modules executing preferred method of carrier recovery, FIG. 2 a block diagram of devices or modules of a frequency sweeper unit of arrangement according to FIG. 1, FIG. 3 a block diagram of a scanner device or module within the frequency sweeper unit according to FIG. 2, FIG. 4 charts to illustrate theory of a frequency sweep, FIG. 5 a block diagram of devices or modules of a coarse frequency estimator as in FIG. 1, FIG. 6 a block diagram of devices or modules of a fine frequency estimator as in FIG. 1, FIG. 7 three frame structures used in the known terrestrial digital TV broadcasting standard in China, FIG. 8 a diagram of carrier recovery in a known digital system, and FIG. 9 a block diagram of devices executing known method of carrier recovery.

FIG. 1 shows an arrangement of components and/or modules for executing a carrier recovery method for a PN-based system. An input signal or input data id are inputted into a rotator 11. Data or signal, respectively, rotated and outputted out of rotator 11 are forwarded to a selector 12. Signal s-pn outputted of the selector 12 contains a PN-sequence and are inputted into a coarse estimator 13. Estimated data or signal outputted from coarse estimator 13 are set to an input of a switch 15. Switch 15 is controlled by a state control 16. Signal or data selected by the switch 15 are forwarded to a low pass filter 17. Filtered signal or data outputted out of low pass filter 17 are forwarded to a numerical controlled oscillator 18. Oscillator signal outputted of the numerical controlled oscillator 18 is inputted into the rotator 11 in conventional manner.

In contrast to known arrangements output signal of rotator 11 is inputted into a sweeper 20. Signal or data outputted out of the sweeper 20 are set to a further input of the switch 15.

Further, output signal of rotator 11 is set to a timing synchronization module 30. Output signal or output data outputted out of the timing synchronization module 30 are inputted into a channel estimation module 31. Output signal or output data outputted out of the channel estimation module 31 are inputted into a fine estimator 14. Estimation data or estimation signal outputted out of the fine estimator 14 are set to a further input of the switch 15.

In this manner carrier recovery 40 is composed out of a plurality of components or modules.

Method executed by such arrangement and such arrangement can estimate very large frequency offset, especially frequency offset larger than 500 kHz. Such method and device comprising such components, modules and method steps can be used for all systems, which have the PN sequence as a frame head. The precision of the method is very high. Especially, a deviation between the frequency offset and the estimated frequency is less than 0.1 Hz.

Frequency sweeper 20 is composed and used to enlarge the range of successful recovery against carrier frequency offset. Fine estimation within fine estimator 14 uses the information from channel estimation. Thus, the system can get a better performance in carrier recovery with only quite small residual frequency offset.

In this method, the rotator 11 works to move the inputted data id from intermediate frequency IF to baseband with some constant control word in the numerical controlled oscillator 18. The numerical controlled oscillator 18 gets the estimated frequency offset from low pass filter 17 and add it together with the constant control word. By this way, the frequency offset can be compensated in rotator 11.

This method for carrier recovery starts working before the frame and timing synchronization is done. Further, after frame/timing synchronization and channel estimation works correctly, then this method works again for a fine tune of frequency offset. By this way, method is able to achieve a very good performance for carrier recovery.

There are three steps for frequency offset estimation as follows.

Figure 2:
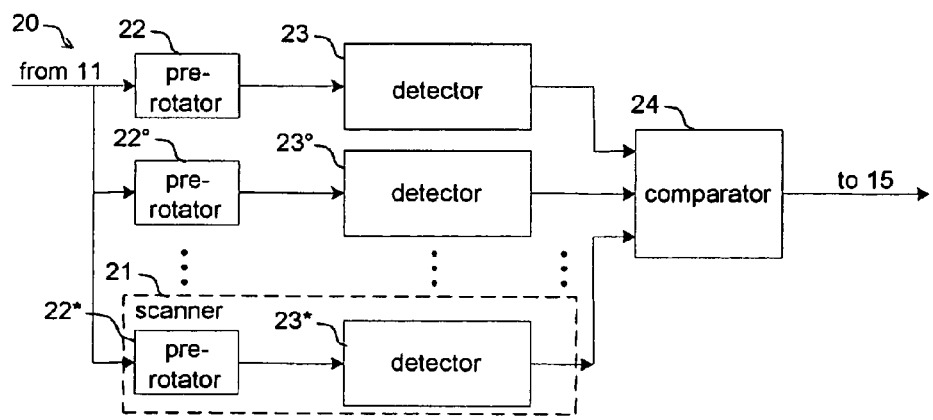
Figure 3:
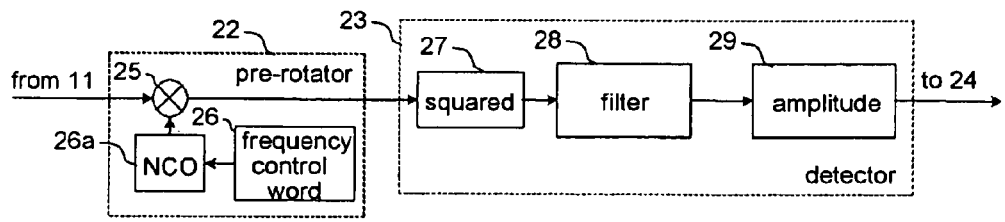

A first step is done in the frequency sweeper 20. The sweeper 20 is constructed as shown in FIGS. 2 and 3 to cope with a wide range of frequency offset since it is difficult to track such a large frequency offset only by PN correlation. The number of scanner modules 21, which are shown in FIG. 2 in more detail, decides the recovery range of sweeper 20. Each scanner 21 is constructed in such manner that it can usually cope with frequency offset from hundreds of kilo Hz to a few of Hz. Especially, its parameters are decided by the length of PN length, by calculation length of detector, and by estimation scope. Thus, in order to cope with e.g. a ±500 kHz frequency offset, there are needed 5 modules of such scanners 21 working in the same time.

FIG. 2 gives a basic diagram of frequency sweep part and FIG. 3 shows a diagram of the scanner 21. The sweeper 20 is constructed out of a plurality of scanners 21. Each scanner is composed of a pre-rotator 22, 22°, . . . , 22\* followed by a detector 23, 23°, . . . , 23\*. Signal or data outputted from rotator 11 are inputted in parallel in each of the pre-rotators 22, 22°, . . . , 22\*. After processing within the pre-rotators 22, 22°, . . . , 22\* pre-rotated data are outputted out of the corresponding pre-rotators 22, 22°, . . . , 22\* and are inputted into the detector 23, 23°, . . . , 23\* following the corresponding pre-rotator 22, 22°, . . . , 22\*. Results, i.e. data outputted from the detectors 23, 23°, . . . , 23\* are inputted into a comparator 24. Data outputted out of the comparator 24 are set to the corresponding input of the switch 15.

FIG. 3 shows one scanner module out of the plurality of scanners 21 shown in FIG. 2. Pre-rotator 22 is composed out of a multiplier 25 having two inputs to input data from rotator 11 to be multiplied with data from a local numerical controlled oscillator 26a. The local numerical controlled oscillator 26a is controlled by a frequency control that is provided from a control unit or memory unit 26. Multiplied data outputted from multiplier 25 are outputted out of the pre-rotator 22 and are inputted into a squaring unit 27 being a first component of corresponding detector 23. Value outputted from squaring unit 27 is inputted into a filter 28. Output value of filter 28 is inputted into an amplitude unit 29. Output value of this amplitude unit 29 is outputted to corresponding input of comparator 24.

According to FIGS. 2 and 3 the input signal from rotator 11 is first pre-rotated by using different given frequency control word in each of the scanners 21. Thereafter, the rotated signal is multiplied by itself, i.e. it is squared in squaring unit 27. After that, the consecutive squared signals are averaged by filtering with fixed taps. In the corresponding detector 23, noise after filtering could be suppressed by setting the filter result in amplitude unit 29 to be zeros if the filter result is lower than a definable threshold.

Arranged after the scanners 21, the comparator 24 is adapted to judge which path coming from the plurality of scanners 21 should be chosen by a comparison with input from all scanners 21. There is one confidence counter for each input and each of the confidence counters increases its value by one if the corresponding input is the largest one among all nonzero inputs. This operation will maybe continue several frames until one of the values of counter exceeds the predefined threshold. Alternatively, it could also operates in fixed number of frames, then selecting the path whose counter's value is the largest one. This control mechanism can work well even with strong noise.

Frequency sweeper 20 recovers the frequency offset within a relative small range so that the second step can start work.

Figure 4:
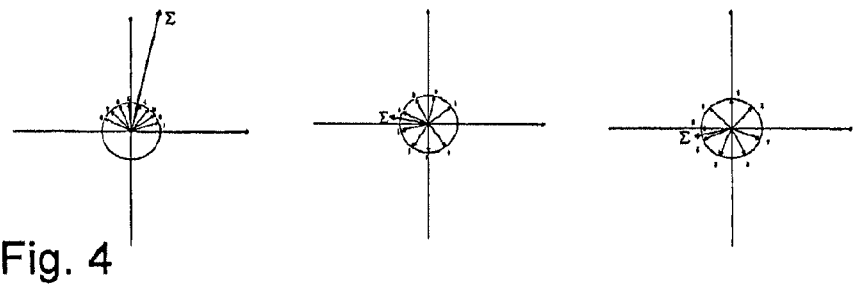

The diagrams in FIG. 4 shows the theory of sweep.

The step of coarse estimation of frequency offset uses the correlation methodology to estimate the frequency offset. Totally there are three stages for this step.

Figure 5:
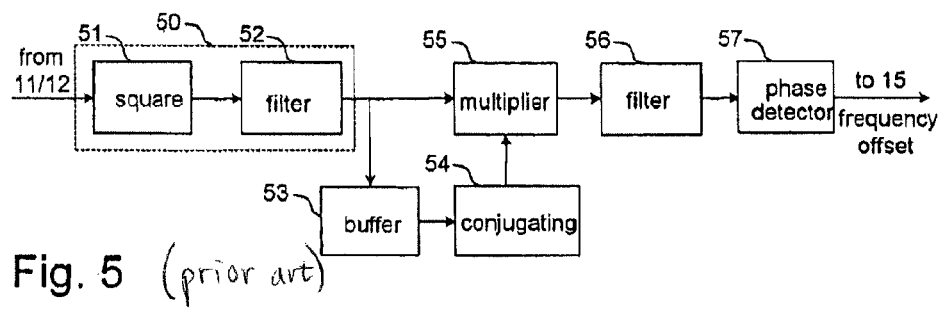

As shown in FIG. 5 data or a signal outputted from rotator 11 and selected by selector 12 are inputted into a first squaring and filter block 50. Within this block data are squared in a squaring unit 51 and then filtered in a filter 52. Data or signal filtered are outputted to a buffer 53 and are outputted to a multiplier 55. Data or signal outputted to the buffer 53 are buffered and thereafter forwarded to a conjugating unit 54. Conjugated data are outputted to a further input of the multiplier 55. Data or signal multiplied in multiplier 55 are forwarded to a filter 56. Data or signal filtered in filter 56 are forwarded to a phase detector module 57. Phase detector module 57 outputs a frequency offset to switch 15.

In the first stage, within the coarse estimator 13 the input signal into the squaring and filter block 50 is squared and then averaged by filter unit 52. Then the signal is conjugated multiplied with the signal which is buffered from slide accumulate filter output. The signal after multiplier 55 is filtered again to reduce the influence of noise and then inputted into the phase detector module 57 is adapted to get the estimated frequency offset. In this stage, the length of the buffer 53 can be controlled by a state machine, generally the length of the buffer 53 is increased gradually.

If the estimation precision is not within the estimation range of next stage, the same method with larger buffer could be used to estimate further. In this case state control 16 controls switch 15 to select signal of coarse estimator 13 to be forwarded to numerical controlled oscillator 18 until estimation precision is within the estimation range of next stage. Especially, instead of a buffer another form of storage unit can be used.

In the second stage, in case that frame head is cyclic generated, for instance the first and third frame modes in Chinese Terrestrial DTV standard, multiplier 55 use PN and its cyclic part to do the multiplication. That means the length of buffer is 255 and 511, respectively. If frame head is non-cyclic generated, for instance the second frame mode in Chinese Terrestrial DTV standard, then this stage is the same with first one, and only the buffer length is increased.

In the third stage, the conjugated multiplication is done in the period of frame head between two consecutive frames. So the buffer length of buffer 53 is equal to the frame length. If the PN in different frame has same phase, the processing of square and filter in squaring and filter block 50 can be skipped.

In this part, the squared input data could be averaged first with fixed taps before doing the correlation, which would decrease the effect of noise.

After step two, the range of residual frequency offset can be controlled within tens of Hertz. So in a multi-carrier system, the residual frequency offset is enough low for channel estimation to work correctly. Then, by using the estimated channel information of channel estimation module 31, a fine estimation of frequency offset can be done. This step may reduce the residual frequency offset to less than 0.1 Hz.

The fine frequency estimation is to use the phase difference in estimated channel information. The estimated channel has the information of common phase error and in different frame the value is different for carrier frequency offset.

The transmitted baseband signal s(n) passes through the channel h(n) and adds the carrier frequency offset freoff, then the received baseband signal r(n) has the following equation.

$$r(n) = \sum_{i=1}^{L-1}(h(i)\cdot s(n-i))\cdot \exp(j\cdot 2\cdot pi\cdot freoff\cdot Ts\cdot n). \quad (1)$$

Ts in above equation is the system clock. L is the length of channel.

Then the PN part of two consecutive frames is shown below.

$$r(n+l\cdot \text{frm\_len}) = \quad (2)$$
$$\sum_{i=1}^{L-1}(h(i)\cdot pn(n-i))\cdot \exp(j\cdot 2\cdot pi\cdot freoff\cdot Ts\cdot (n+l\cdot \text{frm\_len}))$$

$$r(n+(l+1)\cdot \text{frm\_len}) = \quad (3)$$
$$\sum_{i=1}^{L-1}(h(i)\cdot pn(n-i))\cdot \exp(j\cdot 2\cdot pi\cdot freoff\cdot Ts\cdot (n+(l+1)\cdot \text{frm\_len}))$$

wherein frm_len is the frame length. With the information of PN part, the channel information can be got. The corresponding estimated channel information could be illustrated as follows.

$$h_1 = h\cdot A$$

$$h_2 = h\cdot A\cdot \exp(j\cdot 2\cdot pi\cdot freoff\cdot Ts\cdot frm\_len)$$

A is a value, which has relationship with carrier frequency offset and frame length. Then from comparing two estimated channel information, the fine frequency offset is obtained.

This method can be used in all systems which has the estimated channel information. A corresponding diagram of fine frequency estimation is shown in FIG. 6.

Figure 6:
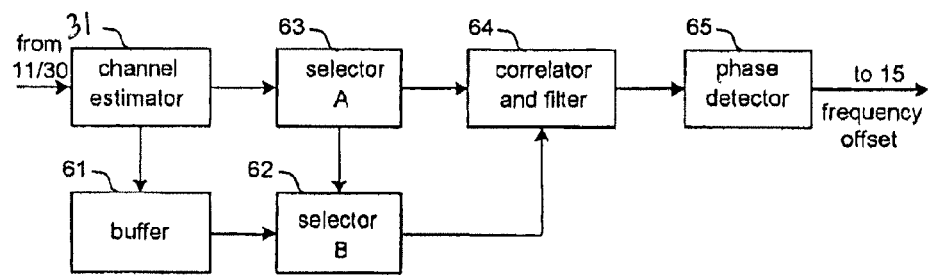
Figure 7:
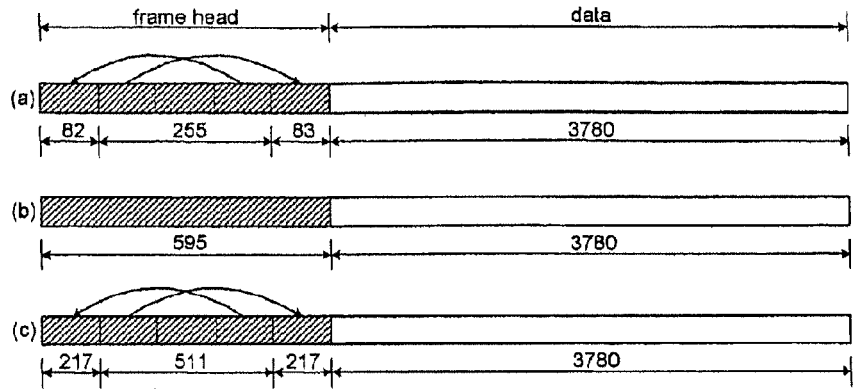
Figure 8:
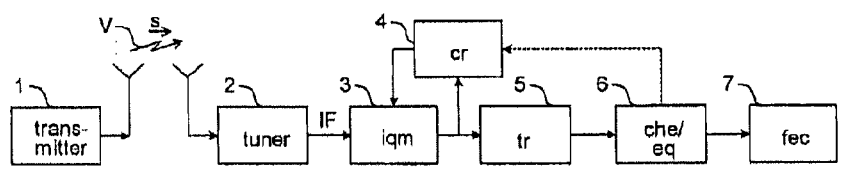
Figure 9:
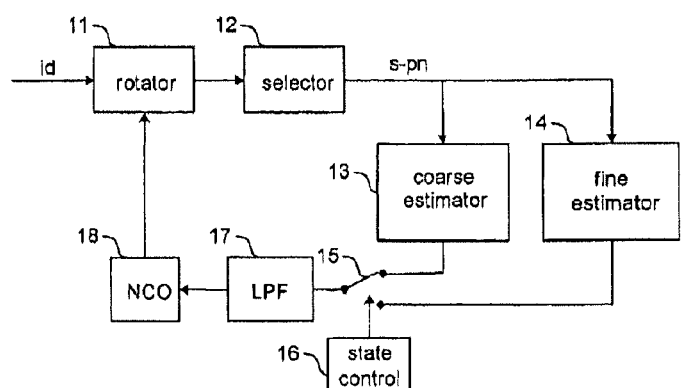

FIG. 6 shows a block diagram of the fine estimator 14 being arranged and controlled for fine tune loop of carrier recovery. Data or signal outputted from channel estimator module 31 are forwarded to a selector A 63. Further data or signal are outputted from the channel estimator 31 to a buffer 61. After buffering in buffer 61 data or signal are forwarded to a further selector B 62. In addition data are forwarded from first selector A 63 to second selector B 62. Each of the selectors A and B 63, 62 outputs data or signal to a correlator and filter unit 64. After correlation and filtering data or signal are outputted from correlator and filter module 64 to a phase detector 65. Phase detector 65 outputs a frequency offset to switch 15.

In FIG. 6, the estimated channel information puts to the selector A 63 and buffer 61. The selector A 63 selects the path larger than a threshold, then selector B 62 selects the corresponding position's value of the previous frame's. Two selected data are conjugated with each other and get together using the filter 64. At last, the phase detector 65 calculates as an angle unit the residual frequency offset according to the filtered data.

The invention claimed is:

1. A carrier recovery device comprising:
   a coarse estimator,
   a fine estimator,
   a switch to select an estimator output, and
   a sweeper configured to sweep an input data carrier frequency offset within a certain range, the sweeper comprising a plurality of parallel scanners, each scanner including a pre-rotator and a detector, each pre-rotator configured to use a respective pre-defined frequency value to rotate data inputted into said pre-rotator, each detector configured to calculate a detected value based on an output of a corresponding pre-rotator;
   wherein the coarse estimator receives, as input, a pseudo random noise signal and is arranged to estimate a residual frequency offset by using a correlation of the pseudo random noise;
   wherein the fine estimator receives, as input, estimated channel information distinct from the pseudo random noise signal, and is arranged to estimate the residual frequency offset by using the estimated channel information;
   wherein the switch is controlled to select data outputted out of the coarse estimator, the fine estimator or the sweeper as the estimator output.

2. The device according to claim 1, wherein the sweeper further comprises an output of one of the scanners which is closest to a real frequency offset.

3. The device according to claim 1, wherein a detector of each scanner to calculate an amplitude of a slide accumulated value of the rotated data.

4. The device according to claim 1, wherein the coarse frequency estimator is arranged to estimate a coarse frequency offset by squaring a signal from at least one of a rotator and a selector when the pseudo random noise sequence has different phase in different frames.

5. The device according to claim 4, wherein the coarse frequency estimator is arranged to filter squared signal to decrease the effect of noise.

6. The device according to claim 5, wherein the fine estimator is arranged to estimate the fine frequency offset by using an estimated channel information to estimate the residual frequency offset.

7. The device according to claim 6, wherein the fine frequency estimator comprises
   a storage to store a pre-frame's estimated channel information,
   a first selector to select an estimated channel's path whose amplitude is larger than a threshold,
   a second selector to select the pre-frame's estimated channel's path with same selected position in present one,
   a correlator to correlate the selected channel information outputted out of selectors with each other,
   a filter to calculate a common phase difference in two consecutive estimated channel information, and
   a phase detector to extract a phase difference and to get the residual frequency offset.

8. A carrier recovery method for pseudo random noise based systems, the method comprising:
   sweeping, using a sweeper, an input data carrier frequency offset within a certain range, wherein the sweeper includes a plurality of parallel scanners, and the sweeping includes:
      rotating data inputted into each scanner using a respective pre-defined frequency value, and
      calculating a detected value based on the rotating performed for each scanner;
   estimating, using a coarse estimator, a residual frequency offset by inputting a pseudo random noise signal and using a correlation of the pseudo random noise;
   estimating, using a fine estimator, the residual frequency offset by inputting estimated channel information signal distinct from the pseudo random noise signal and using the estimated channel information; and
   selecting an estimator output, using a switch to select data outputted from the sweeper, the coarse estimator, and the fine estimator as the estimator output.

9. The method of claim 8, wherein the method further comprises:
selecting a scanner output which is closest to a real frequency offset.

10. The method according to claim 9, further comprising:
calculating an amplitude of a slide accumulated value of the rotated data.

11. The method of claim 10 further comprising:
estimating a coarse frequency offset using the coarse frequency estimator by squaring a signal from a rotator when the pseudo random noise sequence has a different phase in different frames.

12. The method of claim 11 wherein the coarse frequency estimator is arranged to filter the squared signal to decrease an effect of noise.

13. The method of claim 12 wherein the fine estimator is arranged to estimate a fine frequency offset by using the estimated channel information to estimate the residual frequency offset.

14. The method according to claim 12 further comprising:
storing a pre-frame's estimated channel information in a storage in the fine frequency estimator;
selecting an estimated channel's path whose amplitude is larger than a threshold using a first selector in the fine frequency estimator;
selecting the pre-frame's estimated channel's path with same selected position in present one using a second selector in the fine frequency estimator;
correlating the selected channel information outputted out of selectors with each other using a correlator in the fine frequency estimator;
calculating a common phase difference in two consecutive estimated channels using a filter in the fine frequency estimator; and
extracting a phase difference to receive the residual frequency offset using a phase detector.

15. The method of claim 14 further comprising:
calculating, using the sweeper, a sweeper input data carrier frequency within a certain range;
estimating a residual frequency offset within the coarse estimator by inputting a pseudo random noise signal and using a correlation of the pseudo random noise;
estimating the residual frequency offset in the fine estimator by inputting an estimated channel information signal distinct from the pseudo random noise signal and using the estimated channel information; and
switching between steps based on the residual frequency offset's amount outputted out of the coarse estimator, the fine estimator or the sweeper as the estimator output.

16. A computer program product, comprising a non-transitory computer usable medium having a computer readable program code embodied therein, said computer readable program code adapted to be executed to implement a method for carrier recovery, the method comprising:
sweeping, using a sweeper, an input data carrier frequency offset within a certain range wherein the sweeper includes a plurality of parallel scanners, and the sweeping includes:
rotating data inputted into each scanner using a respective pre-defined frequency value, and
calculating a detected value based on the rotating performed for each scanner;
estimating, using a coarse estimator, a residual frequency offset by inputting a pseudo random noise signal and using a correlation of the pseudo random noise;
estimating, using a fine estimator, the residual frequency offset by inputting an estimated channel information signal distinct from the pseudo random noise signal and using the estimated channel information; and
selecting an estimator output, using a switch to select data outputted from the sweeper, the coarse estimator, and the fine estimator as the estimator output.

* * * * *